E. FOOTE.
Gas-Burners.
No. 137,905.  Patented April 15, 1873.
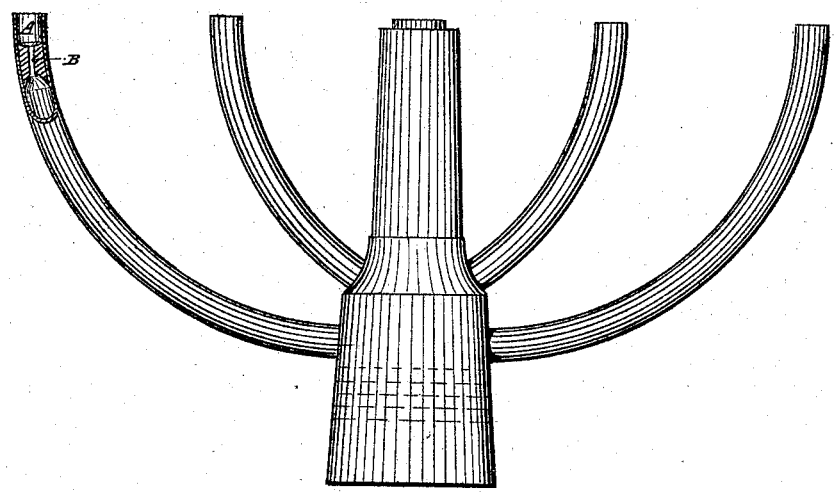
Witnesses.
J. H. Poole
M. F. Henderson
Inventor,
Elisha Foote

UNITED STATES PATENT OFFICE.

ELISHA FOOTE, OF YONKERS, NEW YORK.

IMPROVEMENT IN GAS-BURNERS.

Specification forming part of Letters Patent No. 137,905, dated April 15, 1873; application filed March 1, 1873.

*To all whom it may concern:*

Be it known that I, ELISHA FOOTE, of Yonkers, in the county of Westchester and State of New York, have invented certain Improvements in Gas-Burners, of which the following is a specification:

Most of the gas burners in common use—indeed all of them with which I am acquainted except the Argand—are subject to flicker and give an unsteady light that is hurtful to the eyes and wasteful of gas. My invention has for its object to remedy this defect.

The various attempts that have heretofore been made to overcome such flickering have been founded, so far as my knowledge extends, upon the supposition that they were produced by fluctuations in the pressure of the gas and in its flow through the orifice of the burner. This supposition my experiments have shown to be entirely erroneous, and the devices founded upon it have consequently failed of success.

The true explanation, in my view, is that the flickerings are produced by slight explosions and imperfect combustion caused by the intermixture of gas with air before it is burned, and often at a temperature below the point of ignition.

The remedy resulting from this view of the subject becomes quite simple. I cause the gas to issue from the burner in a compact mass, to burn on the outside of it only, to become gradually heated in passing from the interior to the outside of the flame, and the air is permitted to flow around and upward from the flame in a steady uniform current without obstruction or interference.

The annexed drawing, made of double size, represents one of my burners with five orifices. One of the arms, with its orifices, &c., is represented partly in section to show the internal structure of that and the rest of them.

Into the end of the arm or tube conducting the gas to the orifice I insert a plug gas-tight, and through the center of it, and, consequently, along the central line of the tube, I drill a single round orifice for the escape of gas, as shown at B. The diameter of this orifice is one thirty-second of an inch for an ordinary burner, its depth about one-eighth of an inch, and the diameter of the tube two or three times that of the orifice. The gas flows from the center of the tube into this orifice, and the depth of the latter causes the particles to assume a parallel direction as they move along it and issue in a steady unbroken current. I have, however, much increased the beneficial results of this construction by what I term the expansion-chamber. It is shown at A. It is simply an enlargement above the orifice, having its center in the same straight line with the central line of the orifice and tube. It extends upward about three-sixteenths of an inch above the orifice, and has a diameter three or four times that of the orifice. It may be entirely cylindrical, or the lower part of it may be conical. The gas, as it issues from the orifice, expands and fills this chamber, and flows from it in a compact cylindrical mass. Care must be taken in its construction that no air be allowed to enter this chamber and mix with the gas, as that will materially impair the quantity of light. This chamber serves, also, another purpose. It becomes heated and communicates its heat to the rest of the burner and to the gas that flows along it, and a whiter light and more perfect combustion are thereby produced.

Where more than one orifice is required I make them entirely separate and about three-fourths of an inch apart, so that one shall not interfere with the other. The proper circulation of air between and around the jet I have best attained by making separate arms for each jet, branching out the proper distance from each other. The drawing shows a very suitable form. These make but little obstruction to the upward flow of air between the jets, and they cast but small shadows from the light. Any intermixture or interference of these jets one with another, or any obstruction to a steady flow of air between and around them injures much the effect of the burner.

Should larger orifices be used, about the same proportions for other parts may be maintained.

What I claim as new, and desire to secure by Letters Patent, is—

1. A gas-burner composed of the several parts, and constructed substantially as shown, for the purposes specified.

2. The expansion-chamber A, constructed substantially as described, and with its center in the same straight line with the central line of the deep orifice.

3. The deep orifice B, when used in connection with a tube of larger size leading thereto and concentric therewith, as shown.

4. The several combinations hereinafter specified, to wit: First, the separate jets and deep orifices; second, the separate jets and the expansion-chambers, as above described; third, the separate jets, deep orifices, and expansion-chambers; and fourth, the deep orifices and expansion-chambers, all substantially as described.

ELISHA FOOTE.

Witnesses:
M. F. HENDERSON,
THOMAS C. CONNOLLY.